United States Patent [19]
Cooper et al.

[11] Patent Number: 4,660,950
[45] Date of Patent: Apr. 28, 1987

[54] MOTOR-DRIVEN CAMERA CONTROL MECHANISM

[75] Inventors: Andrew T. Cooper, Rochester; Robert P. Cloutier, Spencerport; Richard A. Gates, Hilton, all of N.Y.

[73] Assignee: Eastman Kodak Company, Rochester, N.Y.

[21] Appl. No.: 748,534

[22] Filed: Jun. 24, 1985

[51] Int. Cl.4 .............................................. G03B 17/38
[52] U.S. Cl. .................................. 354/173.1; 354/121; 354/266
[58] Field of Search .................... 354/121, 173.1, 204, 354/251, 266

[56] References Cited

U.S. PATENT DOCUMENTS

| | | |
|---|---|---|
| 2,625,087 | 1/1953 | Steineck .............................. 354/121 |
| 3,895,389 | 7/1975 | Arai ................................. 354/173.1 |
| 4,202,614 | 5/1980 | Harvey ............................... 354/121 |
| 4,203,662 | 5/1980 | Stemme et al. ....................... 354/266 |
| 4,212,525 | 7/1980 | Urano et al. ........................ 354/266 |
| 4,309,096 | 1/1982 | Sethi ................................. 354/121 |
| 4,361,387 | 11/1982 | Cloutier ............................ 354/121 |
| 4,449,806 | 5/1984 | Wong et al. ......................... 354/121 |
| 4,492,443 | 1/1985 | Spencer et al. ..................... 354/266 |

OTHER PUBLICATIONS

Research Disclosure, Mar. 1982, Industrial Opportunities Ltd., Havent, England, pp. 97-98, 100-101.

Primary Examiner—A. A. Mathews
Attorney, Agent, or Firm—Robert L. Randall

[57] ABSTRACT

A control mechanism for a motorized disk film camera which is of simple, compact and inexpensive construction and yet provides one-button operation to expose the film and actuate a motor which disengages the film and cocks the shutter, then advances and locates the film. The camera requires no expensive control components or switching mechanisms to synchronize the operation of the camera or to initialize a cartridge when it is loaded into the camera.

13 Claims, 16 Drawing Figures

MOTOR-DRIVEN CAMERA CONTROL MECHANISM

BACKGROUND OF THE INVENTION

1. Field of the Invention

The present invention relates to a simple, inexpensive camera control mechanism in which a simple mechanical element activated by a manual shutter actuating button serves to release the shutter and then actuates a motor to disengage and advance the film and recock the shutter and then to terminate the operating cycle.

2. Description of the Prior Art

Cameras for use with a film disk are currently marketed by Eastman Kodak Company and others incorporating a motor drive which is energized by the operator to locate, expose and advance the film. This camera/film combination provides the consumer with unprecedented convenience in that the operation is totally automated and the physical size permits ready pocketability. One example of the structure of such a camera is found in U.S. Pat. No. 4,361,387 issued in the name of R. Cloutier.

Other cameras have been devised for use with disk film which are simpler in construction and operation, utilizing manual operations for film location, exposure and advance. One such camera is described in U.S. Pat. No. 4,492,443 which illustrates a manually operated camera that provides substantially the same operational features of the Cloutier camera, but without the expense of a motor and its controls. This camera provides the convenience of one-button operation to first actuate the shutter and then to advance the film.

Other examples of prior art cameras used with film disks include U.S. Pat. No. 4,202,614 which illustrates another manually operated camera and U.S. Pat. No. 2,625,087 which discloses a camera that utilizes a reloadable film cartridge assembly with film in the form of a disk. This last camera permits one-button operation, actuating the shutter for film exposure and then advancing the film for the next exposure. However, this camera does not provide a mechanism for the accurate location of the film during exposure and for subsequent release to permit advancing the film for the next exposure. Thus, this camera does not provide sufficiently accurate film positioning to ensure high resolution photographs under all conditions.

Still other examples of prior art cameras for use with film disks are disclosed at pages 97–98 and 100–101 of the March 1982 issue of Research Disclosure published by Industrial Opportunities Ltd. Havant, England. These cameras are reasonably simple and compact, providing manual and one-button operation. Nevertheless, each of these cameras suffers from structural limitations that detract from the operating convenience for the customer.

While the camera disclosed in U.S. Pat. No. 4,361,387 provides ease of operation, it has the potential disadvantage of requiring complex and somewhat expensive electrical sensing, actuating and logic systems. It has been found that such components and systems add to the complexity and cost of such cameras, increasing their cost to consumers.

The use of small electric motors to perform some or all of the camera functions, such as to disengage the film, to advance the film, recock the shutter, and to reengage the film would provide certain advantages to the consumer at a reasonable cost if they did not utilize complex and expensive electronic sensors and controls.

SUMMARY OF THE INVENTION

Accordingly, the present invention provides a control mechanism for a disk film camera which is of simple and inexpensive construction and yet which provides one-button motorized operation to locate the film, advance the next film frame and reset the shutter. This arrangement permits the use of a very short stroke shutter actuating button and motorized film advance and recocking of the shutter without the necessity of complex and expensive motor controls.

According to one aspect of the present invention, a motorized camera is provided having a cockable and releasable shutter means, a film advancing means, a motor means, driving means coupling the motor means to the film advancing means, a power source and a manually actuated shutter button. Control means is provided for releasing the shutter and actuating the motor and comprises a first means engagable by the shutter button to release the shutter when the control means moves to a second position where it is held by the depressed shutter button. When the shutter button is released, the control means moves to a third position and energizes the motor to start the film advancing cycle. The driving means returns the first means to the initial position and de-energizes the motor at the end of the film advancing cycle.

Further, the present invention provides a camera control mechanism that connects the power source to another circuit, such a flash charging circuit when the motor is not energized.

Various means for practicing the invention and other features and advantages thereof will be apparent from the following detailed description of illustrative preferred embodiments of the invention, reference being made to the accompanying drawings.

IN THE DRAWINGS

DESCRIPTION OF THE ILLUSTRATIVE PREFERRED EMBODIMENTS

Although the present invention is applicable to various kinds of cameras, the illustrative embodiments are directed to cameras adapted to use disk film cartridges of the type disclosed in U.S. Pat. No. 4,309,096, entitled FILM CARTRIDGE ASSEMBLY WITH PRESSURE PLATE which issued in the name of G. S. Sethi.

General Description of Cartridge and Camera

Figure 1:
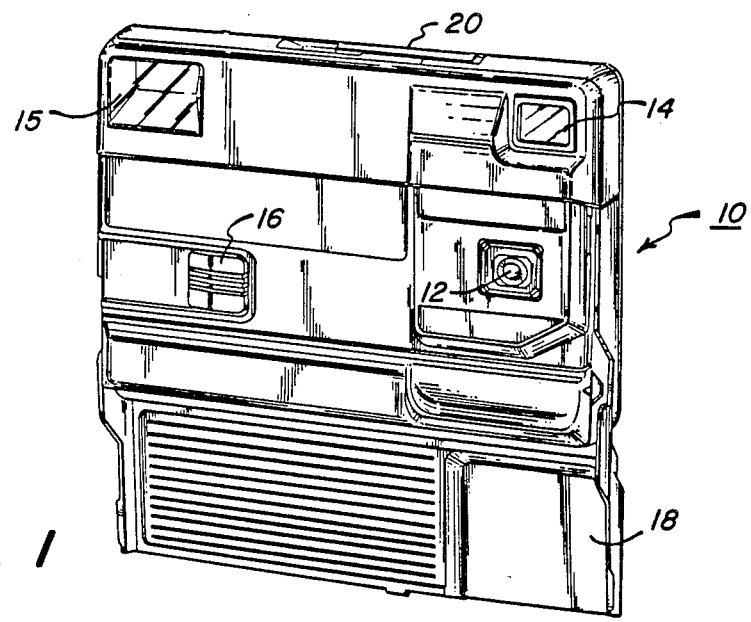
FIG. 1 is a front perspective view of a camera incorporating the invention depicting the camera in its normal operating position.
Figure 2:
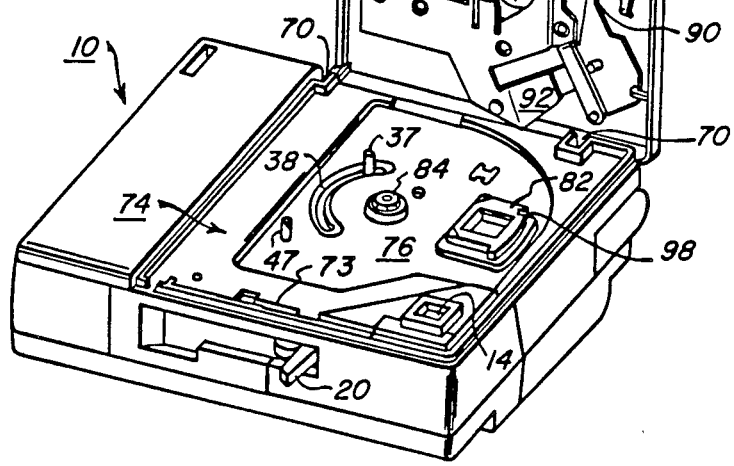
FIG. 2 is a rear perspective view of the camera shown in FIG. 1; depicting the camera in a horizontal, "face-down" position with the loading door in an open position and showing a film cartridge in position for loading into the camera.

Referring now to the drawings and in particular to FIGS. 1 and 2, there is shown front and rear perspective views of a camera 10 incorporating the present invention. The camera comprises a body in the form of a relatively thin, generally rectangular box. The camera front, shown in FIG. 1, includes a picture-taking lens 12, a viewfinder 14, a flash 15, and a shutter release button 16. Additionally, the camera can be provided with a movable cover-handle 18, as is well known in the art. A door release lever 20, disposed in the top edge of the camera, is operable to unlatch a rear door 22 of the camera so that it may be opened for loading a film cartridge assembly into a receiving chamber, as will be more fully described hereinbelow.

A film cartridge 24 is shown in FIG. 2 and, according to the teachings of the foregoing Sethi patent, comprises a generally flat light-tight plastic housing 25 enclosing a rotatable disk of film 26 provided with a central hub 27 that is accessible from the exterior of the housing. As described in the Sethi patent, the film disk is provided with a plurality of uniformly spaced exposure regions defined by previously exposing the surrounding portion of the film. Each of the exposure regions is associated with a corresponding adjacent metering notch, located along the edge of the film disk in a clockwise direction from the respective exposure region. An exposure window in the front wall of the cartridge housing is provided with a cover slide that is pivotably movable into and out of alignment with the exposure window by means of a slide operating pin 37 (FIG. 2) that extends through an arcuate slot 38 in the camera wall and is received between two studs on the cover slide. The rear wall of the cartridge housing 25 includes pressure plate member 44 in alignment with the exposure window in the front wall. An exposure counter dial on the corresponding face of the film disk hub 27 is also visible through the rear wall.

When the cartridge is loaded into the receiving chamber of the camera, a pin 47 in the camera enters light-tight opening in the front cartridge wall and releases a locking device, not shown, that initially locks the cover slide in alignment with window. Initially, as viewed from the front of the cartridge, the film disk is located in its extreme counterclockwise position, defined by the engagement of a hub ear with the lower edge of a cartridge ear. From this position the film disk initially must be rotated in a clockwise direction through an angle equal to approximately $\frac{1}{3}$ the angle between adjacent image areas to bring the first available image area into exposure position. Similarly, when the film disk has rotated through somewhat less than 360 degrees to its extreme clockwise position, after exposure of all of the image areas, the engagement of the hub ear with the upper edge of the cartridge ear locates the last exposure area clockwise of the exposure window by an angle equal to approximatley $\frac{1}{3}$ the angle between successive exposure areas.

FIG. 2 also shows the camera's rear loading door 22, which is hinged to the camera body at 70 and held in its closed position by a latch 72 and 73 that is releasable by means of lever 20. When the loading door is open, as shown in FIG. 2, the film cartridge 24 is insertable into cartridge chamber 74, in which the front wall of the cartridge lies adjacent the rear surface of an intermediate camera wall 76, located rearwardly of the major components of the camera mechanism to which the present invention is directed. When the cartridge is loaded into the chamber 74, a film support frame member 82, aligned with the camera lens, is received in the exposure window of the cartridge. A driving camera hub member 84 engages the hub 27 of the film disk, and the slide operating pin 37 engages the cover slide. Closing the cover door causes spring members 85 thereon to seat the cartridge against the intermediate wall member and brings a pressure applying member 90, supported by spring arm 92, into alignment with the cartridge pressure plate member 44. Latching of the door causes slide operating pin 37 to move the cover slide out of alignment with the exposure window so that the exposure region of the film disk can be supported against frame member 82 by the pressure plate under the influence of the pressure applying member 90. When the cover slide is open, a metering pawl tooth 98 extends through the exposure window to engage the metering notch in the periphery of the film disk when each exposure region is properly aligned with the lens to control the incremental rotation of the disk. After the film disk has been exposed, the process by which the cover door is unlatched first withdraws the metering pawl tooth from the exposure window and moves the cover slide to close the exposure window. This occurs before the door can be opened, thereby preventing accidental light damage to the exposed film. As the cartridge is removed, the unlocking pin 47 withdraws from the cartridge opening, thus allowing the locking device to again lock the cover slide in its closed position. The foregoing is functionally similar to the mechanism used in commercial cameras.

Figure 3:
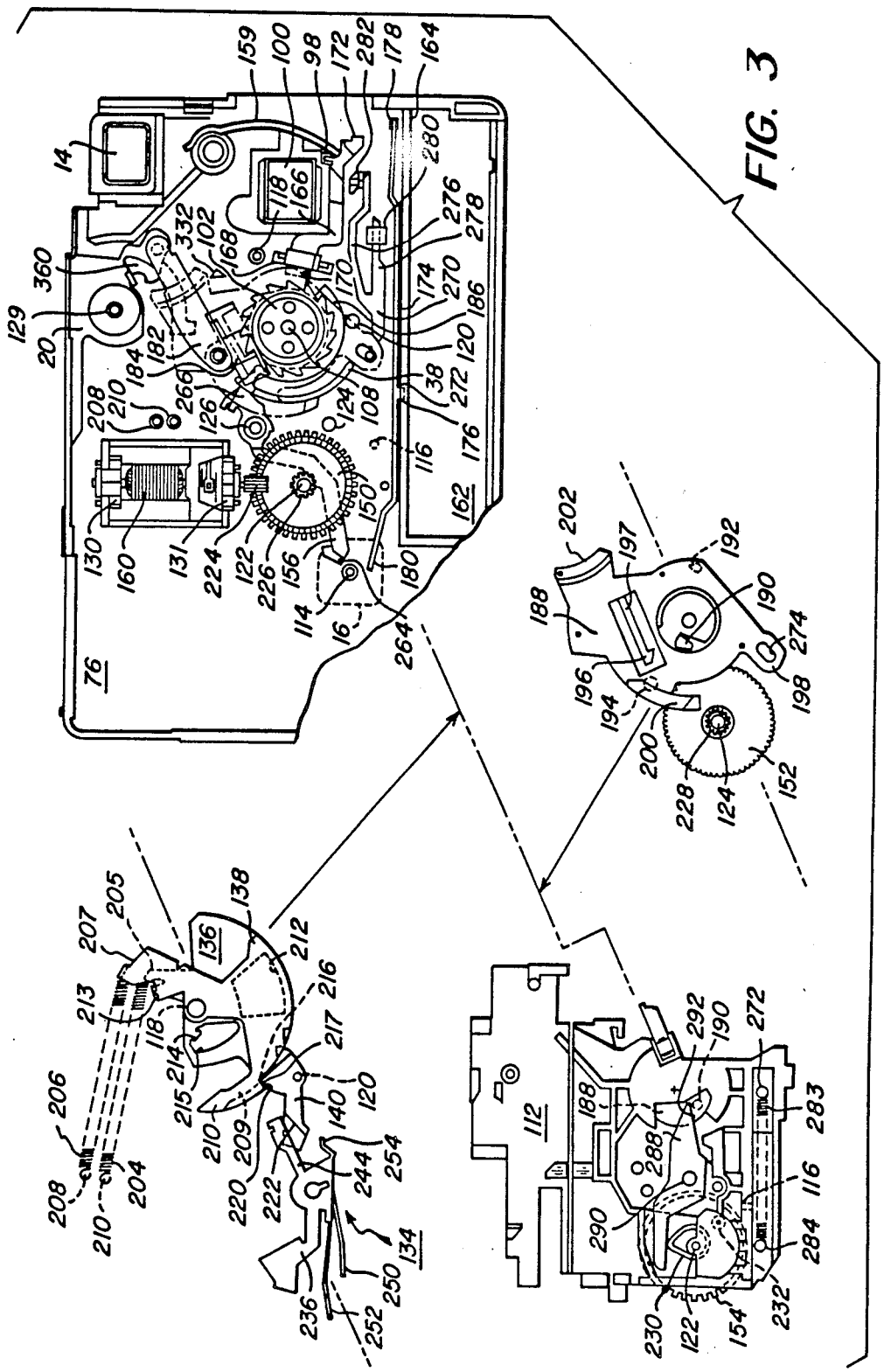
FIG. 3 is a front "exploded" view of the mechanism of the camera shown in FIG. 1.

Referring now to the front view of the mechanism in FIG. 3, the front surface of the intermediate camera wall 76 provides the main mounting member for the camera mechanism components. The lens assembly and the film support frame member 82 (FIG. 2) are constructed so as to assure the requisite film-to-lens location and are mounted through an opening 83 in the intermediate camera wall 76.

The camera hub or film drive member 84 (FIG. 2) extends through an opening in the intermediate camera wall 76 and is an integral part of and coaxial with a drive ratchet gear 102 on the forward side of the wall. An axial shaft 108 extends forwardly of the ratchet gear 102, and is rotatably located in a recess, not shown, in a mechanism plate 112 overlying the intermediate wall 76 and the components thereon. The ratchet gear is provided with the same number of teeth as there are image areas on the film disk, 15 in the case of the presently commercially available film.

Figure 5:
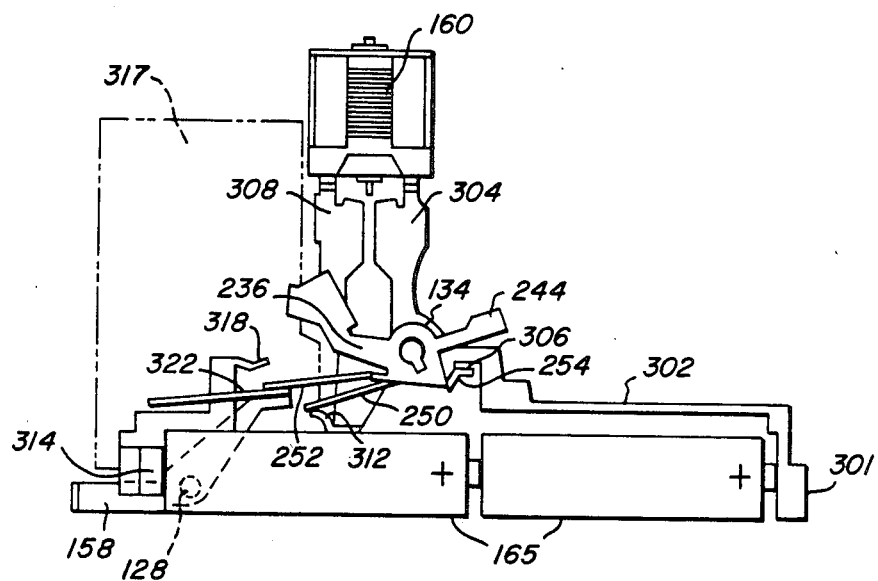
FIG. 5 is an illustration of the motor, switching and circuit components.

The front surface of the intermediate wall 76 is provided with a locating post 114 for the shutter button 16, a post 118 for shutter blades 136 and 138, a post 120 for a shutter latch 140, posts 122 and 124 for gears 150, 152 and 154, post 126 for a blocking lever 156, post 128 for a charger actuator lever 158 (see FIG. 5), post 129 for the door latch lever 20, a guide rail 159 on which the shutter blades ride during actuation, and motor mounting cradles 130, 131 for a motor 160, as will be further described hereinbelow. Additional mounting members and support ribs may also be provided on the front surface of the intermediate wall, for example to locate and connect the camera's circuitry located thereon, as illustrated in FIG. 5. Further locating means may be provided on both the front and rear surfaces of the mechanism plate 112 such as a post 116 for a release lever 134, and shutter stop 332, as appears hereinbelow. A battery compartment 162, separated from the mechanism chamber by a battery compartment wall 164, is provided along the lower portion of the intermediate wall 76. Suitable terminals, 301 and 314 connect with batteries 165 therein to provide operating current to the camera system.

A first film locating means, comprising the metering pawl tooth 98, is carried at one end of a sickle-shaped metering pawl 166 which is pivotally supported by an axle 168 so that the tooth can be moved perpendicular to the intermediate wall 76. The pawl 166 and the pawl tooth 98, are spring-loaded in the film-engaging position by a spring, not shown. The pawl 166 is also provided with a foot portion 170 adjacent the ratchet gear 102 and a lifting cam 172 adjacent the pawl tooth 98.

A second film locating means, comprising a platen actuator lever 174, is disposed along and pivotally supported in the battery compartment wall 164 by a centrally disposed pivot 176. One end of the platen acutator lever 174 is provided with a pin 178 which extends through wall 76 to engage the pressure applying member 90 on the camera door and applies force to the cartridge pressure plate member 44 at the appropriate time in the exposure cycle. The opposite end 180 of the platen actuator lever is arranged to engage and be actuated by the shutter button 16.

The camera loading door latch is a portion of the door latch lever 20 which is supported by locating post 129. The door release lever 20 is operatively connected by a link 182 to a dark slide lever 184. The dark slide lever includes the slide operating pin 37 which extends through and is movable in slot 38 in the intermediate wall 76. The dark slide lever encircles the hub member 84, between the ratchet gear 102 and the intermediate wall 76, and is arranged to move the dark slide operating pin 37 counterclockwise to close the cartridge dark slide as the door release lever 20 is rotated clockwise to release the camera loading door latch 72. The dark slide lever 184 is also provided with a cam surface 186 arranged to engage and depress the foot portion 170 of the metering pawl 166, thereby retracting the metering pawl tooth 98 from a metering notch in the film disc to permit closure of the cartridge dark slide.

A driver member 188 is mounted on the shaft 108 of the ratchet gear and is arranged for reciprocating pivotal motion in opposite first and second directions. The driver member is provided with a drive boss 190 on the upper surface, and a shutter recocking lug 192 and a blocking lever boss 194 on the lower surface. A film advancing means such as film advance pawl 196 depends from the lower surface of the driver member into engagement with the ratchet gear 102. The shaft of the film advance pawl 196 may be formed integrally of the driver member and has sufficient flexibility to ratchet over the teeth of the ratchet gear during counterclockwise movement of the driver member and to engage the ratchet gear and to advance it during clockwise motion of the driver member. The driver member is also provided with a demetering arm 198, a release lever reset arm 200, and a door lever arm 202, all of which will be described more thoroughly hereinbelow.

The shutter (see FIG. 3), comprising shutter blade 136 and capping blade 138 are mounted on post 118 for rotation thereabout, supported and guided by shutter rail 159. The shutter and capping blades are generally semicircular and are provided at one side with radial arms 205 and 207, respectively, and on the opposite side with trailing arms 209 and 210 which cooperate with the shutter latch 140. Each of the blades are spring loaded in the counterclockwise direction by shutter springs, 204 and 206, extending between the radial arms of the respective blades and posts 208 and 210. The shutter blade is also provided with an exposure aperture 212 and a capping blade engaging tab 213 which provides a stop for the capping blade during exposure and also engages the capping blade 138 during the recocking operation. The shutter blade is also provided with a cocking tab 214 adjacent a cocking lug relief opening 215. The cocking tab is engageable by the shutter recocking lug 192 on the bottom of driver member 188 during the recocking of the shutter. The cocking lug relief opening 215 in the shutter blade provides for relative movement of the cocking lug on the driver member 188 after the shutter has been recocked and during the return movement of the driver member to its initial position. The shutter blade and the capping blade are each provided with a shutter latch engaging surface 216 and 217 which are engaged by the shutter latch 140.

The shutter latch member 140 is rotably mounted on post 120 and is spring loaded in the clockwise direction by a spring, not shown. The shutter latch includes a shutter blade engaging lip 220 and a release lever engaging lip 222. The two lips of the shutter latch are so arranged that clockwise motion of the release lever will move the shutter latch counterclockwise against the force of its spring to release the shutter latch surface 216, permitting the shutter blade to commence the exposure cycle. It will be noted that the latch engaging surface of the shutter blade is shorter than that of the capping blade so that it may be released without releasing the capping blade. The trailing arm of the shutter blade is also provided with a ramp surface 218 which, during its movement in the exposure cycle, engages the shutter latch 140 at the point that the exposure aperture fully uncovers the lens and causes the shutter latch to rotate further counterclockwise to release the capping blade which then moves to cover the aperture and terminate the exposure.

The motor 160, mounted in cradles 130 and 131 formed on the intermediate wall 76, is provided with a drive pinion 224 which engages the crown gear 150. The pinion 226 of the crown gear engages idler gear 152, the pinion 228 of which engages cam gear 154. The cam gear carries on its upper surface cam 230, and on the lower surface a release lever boss 232.

Figure 4:
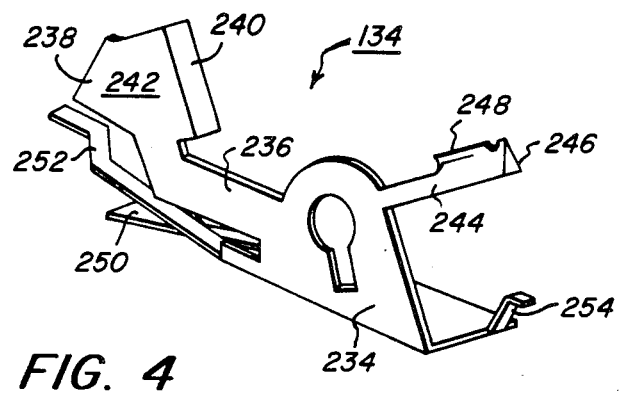
FIG. 4 is a detail view of the release lever which is the heart of the control mechanism.

The release lever 134 (see FIG. 4) is rotably mounted on locating post 116 on the back of the mechanism plate and is a multi-function element which serves as the operating control for the entire camera operation sequence. The release lever includes a hub 234 from which a multiplicity of arms extend: a shutter button-engaging arm 236 which is provided with a shutter button-engaging tab 238, a cam gear boss-engaging flange 240, and a cam gear boss-engaging surface 242; a shutter latch-engaging arm 244 which is provided with a shutter latch engaging claw 246 and a reset surface 248; a power contact and spring arm 250 which is provided along the lower surface of the release lever and which provides a spring force to urge the release lever in a clockwise direction about post 116; a charger-run switch arm 252 and a motor shorting switch arm 254 also extend outward in the opposite directions from the lower portion of the release lever hub 234. The release lever is preferably formed of sheet metal or other flexible, electrically conductive material since all of the arms must flex, arms 236 and 244 flexing in a plane parallel to the axis of post 116 and arms 250, 252 and 254 flexing in a plane perpendicular to the axis of post 116. Further, arms 250, 252 and 254 form an integral part of the electrical circuit of the camera and perform various switching functions at appropriate times in the operation thereof. All of these functions are more fully described in the operation portion of this disclosure.

Figure 6:
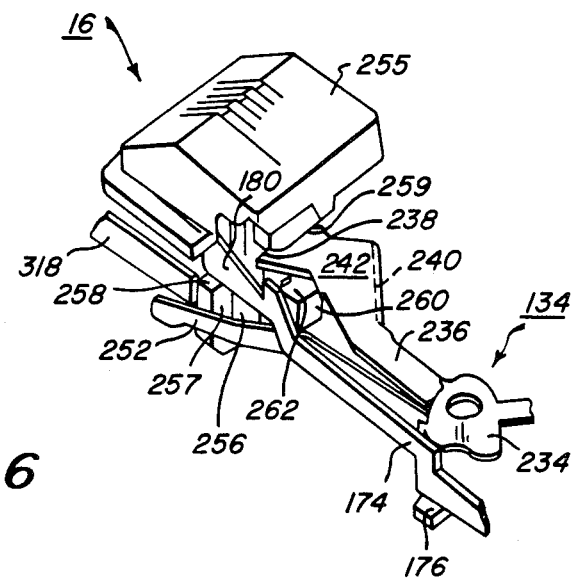
FIG. 6 is an enlarged perspective detail of the shutter button and related components.

The shutter button 16 (see FIG. 6) comprises a button pad 255 which the camera operator engages with his finger to actuate the camera. Extending behind the button pad is a central tubular portion 256 which engages and is guided by locating post 114 extending from the intermediate wall 76 of the camera. The tubular portion entraps a return spring, not shown, between the inner end of the tubular portion and the end of the locating post. A rib 257 extends outwardly from the central tubular portion along the lower side thereof and is arranged to intercept the arm 252 of the release lever 134 when the shutter button is depressed. A slot 258 is provided at the upper end of rib 257 which entraps and moves the end 180 of the platen actuator lever 174. A second rib 260 is provided along the central tubular portion 256 located 90° away from rib 257. Rib 260 is provided with a slot 262 which entraps and moves arm 236 of the release lever when the shutter button is depressed. The lower end of rib 260 is arranged to engage blocking lever 156 during operation of the motor to prevent depression of the shutter button during that portion of the cycle and thus to prevent the possibility of double exposure.

The blocking lever 156 (see FIG. 3) is pivotally mounted on locating post 126 and is provided with a first, shutter button-engaging end 264 and a second blocking lever boss-engaging end 266 which is arranged to cooperate with the boss 194 on the undersurface of the driver member 188. The blocking member is spring-biased in a clockwise direction to urge end 264 into position to block the shutter button 132 by residing under the end of rib 260 except when the opposite end 266 is contacted by the driver member boss 194. The boss 194 urges the blocking lever in a counterclockwise direction against the force of the spring when the driver member is in the initial, at-rest position.

A demetering lever 270 comprises a first driving end having an upwardly extending pin 272 which extends through a slot 274 in the driver member demetering arm 198. The opposite end of demetering lever 270 is bifurcated into a cam leg 276 and a guide leg 278. The guide leg 278 extends in sliding engagement through a locating clip 280 on the intermediate wall 76 to assure the linear motion of the demetering lever during operation of the driver member. The cam leg 276 is flexible to permit lateral motion thereof and is provided at its end with a cam member 282. The cam member is provided with a pair of cam surfaces that cooperate with the lifting cam 172 on the metering pawl 166. The first cam surface engages the side wall of the lifting cam 172 and is arranged to deflect the cam member 282 around the lifting cam during initial movement of the demetering lever, to the right in FIG. 3. After the cam member 282 of the demetering lever has passed to the right of the lifting cam 172 the flexible nature of the cam leg causes the cam member to snap into alignment with the lifting cam 172. The second cam surface of cam member 282 is arranged, as the metering lever 270 is moved to the left, to slide under the lifting cam 172 and to lift it over cam member 282 and, in the process remove the pawl tooth 98 attached to the metering pawl 166 from engagement with the metering notch in the periphery of the film disk preparatory to the film disk being advanced by the film drive hub.

The upper end of pin 272 of the demetering lever 270 extends through the slot 274 in the driver member demetering arm 198 and provides an attachment post for a driver member spring 283 which extends from pin 272 to an attaching post 284 on the upper surface of the mechanism plate 112. The driver member spring 283, in addition to providing a force to the end of the demetering lever also provides a force to the driver member, urging it in the clockwise direction. Accordingly, the driver member spring 283 provides the driving force to the driver member for advancing the film disk during the film advance portion of the camera cycle. Moreover, the spring 283 provides a compliant connection between the driver member and the motor and gear train that permits the camera motor to complete its cycle even though the film disk is unable to advance a full frame, as would occur after the exposure of the last frame of the film disk.

A lever means is arranged to transmit motion between the cam 230 on the cam gear 154 and the driver member 188 and comprises a drive link 288 which is pivotally mounted on a pin 290 on the upper surface of the mechanism plate 112. The drive link is actually a cam follower and is arranged to be driven by cam 230 on the cam gear 154 during operation of the motor. End 292 of the drive link, opposite to the end engaging the cam, engages the drive boss 190 on the driver member 188 to transfer unidirectional rotation of the cam gear 154 into bidirectional motion of the driver member. However, since cam 230 is only a single surface cam, power is only transferred to the driver member during its motion in the first, counterclockwise direction. The movement of the driver member in the second clockwise direction is powered by spring 283 which is energized during the counterclockwise motion of the driver member. The spring then releases its energy to drive the driver member during movement in the second, clockwise direction. During this movement of the driver member to the initial, at rest position, the cam, gear train and motor are not in driving engagement with the driver member but provide a governing action to the movement of the driver member under the force of spring 283 to prevent instant return of the driver member to its initial position and the attendant high forces that would result on the camera components connected thereto.

Figure 7:
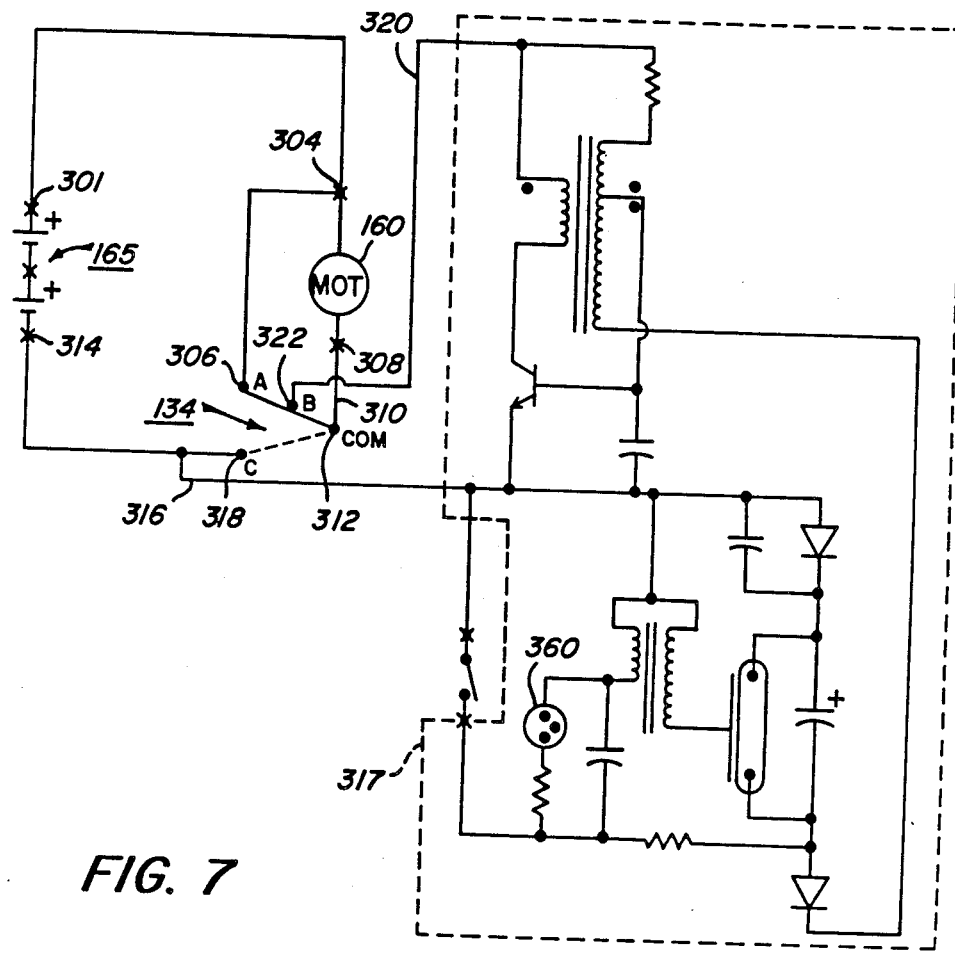
FIG. 7 is a schematic of the electric circuitry of the camera.
Figure 9A:
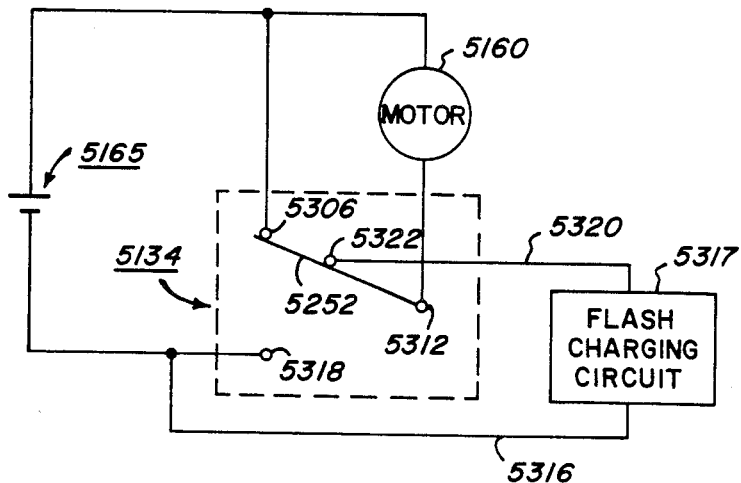
FIGS. 9–12 are schematic illustration of an alternative embodiment.
Figure 9B:
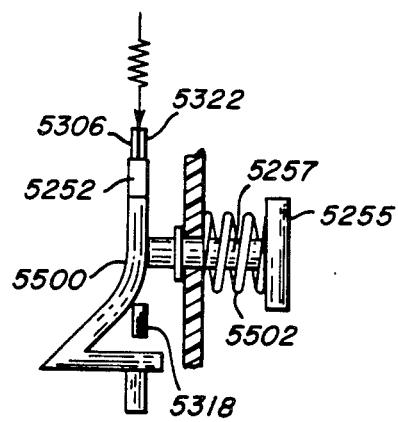
Figure 10A:
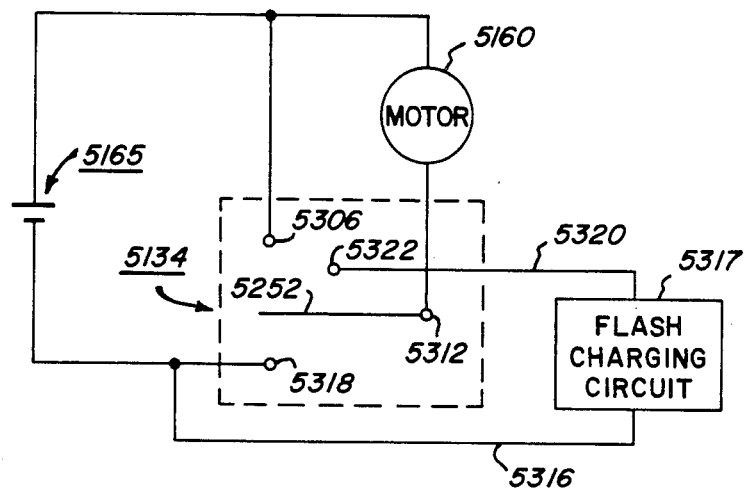
Figure 10B:
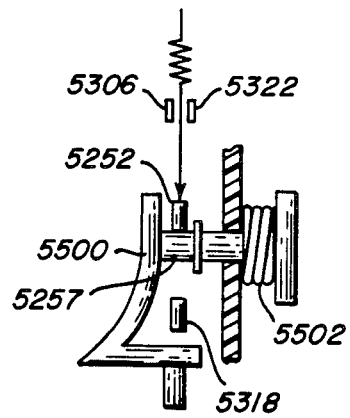
Figure 11A:
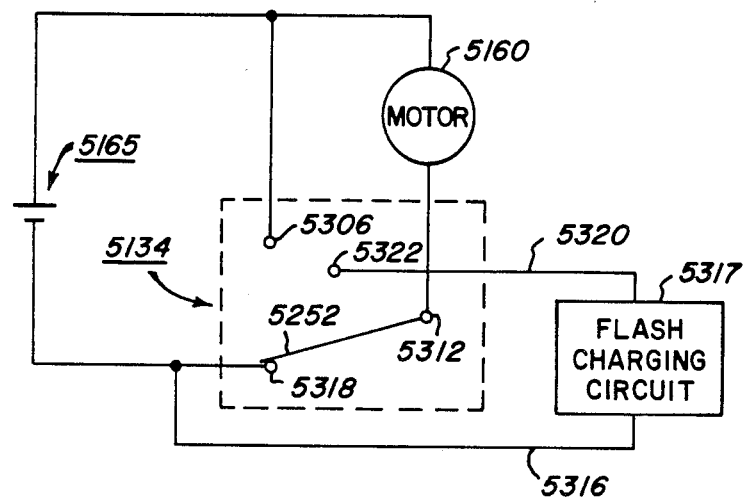
Figure 11B:
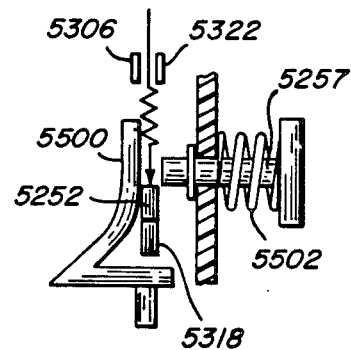

An electric schematic of the electric system of the camera is illustrated in FIG. 7 and illustrates the connection of the batteries, motor and flash charging circuit, with the flash charging circuit being of a type well known in the art. The arrangement of the contacts and leads associated with the circuit as embodied in the camera are illustrated in FIG. 5. As illustrated, the positive terminal of the batteries 165 is connected via terminal 301 to circuit element 302 to one terminal 304 of the motor 160. This leg of the circuit is also provided with a contact 306 which is arranged to connect with motor shorting switch arm 254 of the release lever 134. The opposite terminal 308 of the motor connects to circuit member 310 which terminates in terminal 312 which is arranged to engage the power contact-spring arm 250 of the release lever. A negative battery contact 314 is connected to a negative terminal 316 of the charger circuit 317 and to a contact 318 which is engageable with the charger-run switch arm 252 of the release lever. A charger contact member having a terminal 320 contacting with the positive side of the charger circuit terminates in a contact 322 which is also engageable with the charger-run switch arm 252 of the release lever. As illustrated, with the camera in the "at rest" condition ready for actuation to expose a picture, the release lever forms a complete circuit between the positive battery terminal 301 and the positive terminal of the charger circuit 320 through the terminal 306 release lever arm 254, and release lever arm 252 which contacts the terminal 322 connected with the positive charger circuit terminal 320. At the same time the contact 312 on the negative side of the motor is contacted by the arm 252. Thus the motor is shorted out, assuring no operation of the motor under these conditions and the charger circuit is activated, charging the flash circuit preparatory for actuation.

A charger actuator lever 158 pivotally mounted on post 128 beneath the battery compartment extends from the camera door hinge at the end nearest the flash circuit to the terminal 322 connected to the positive terminal of the charger circuit. The camera door hinge is provided with a tab which engages the end of the charger actuator lever when the door is in the closed position to move the charger actuator lever clockwise whereby the end thereof in contact with terminal 322 moves it out of engagement with the charger-run arm 252, thus disconnecting the charger circuit from the battery during times that the camera door is closed, thereby saving the battery power.

Operation of the Camera

In the operation of a loaded camera of the present invention, the user opens the cover handle, uncovering the lens and the shutter button. When the cover handle is rotated about the hinges at each end of the battery compartment, the tab on the hinge adjacent the flash permits the charger actuator lever 158 to rotate counterclockwise, moving the contact 322 into engagement with arm 252 of the release lever, energizing the flash charging circuit. As illustrated in the schematic, a "ready" light 360 is provided which indicates to the user when the flash circuit is sufficiently charged to permit taking a satisfactory flash exposure.

When the user is ready to take a picture the shutter button 16 is depressed. As the button is depressed, the end 180 of the platen actuator lever which is retained in slot 258 of the shutter button rib 257 is also depressed, pivoting the actuator lever about the pivot 176 and lifting the platen actuator pin 178 at the opposite end, relieving pressure from the pressure applying member 90 in the camera loading door 22. This frees the pressure applying member to apply pressure to the pressure plate member 44 in the film cartridge, pressing the film against the film support frame member 82 and accurately locatimg the film in the exposure plane for optimum focus resolution. Simultaneously, the upper edge of the shutter button rib 260 engages the tab 238 of arm 236 of the release lever 134, forcing it down until the surface 242 clears the lower end of boss 232 on the lower surface of the cam gear 154. As soon as the surface 242 has cleared the lower end of boss 232 the release lever is rotated clockwise about post 116 because of the spring force stored in arm 250. As soon as the release lever rotates, the charger-run switch arm 252 is moved out of contact with the positive terminal 322 for the charger circuit, deactivating the charger circuit. The rotation imparted to the release lever by the spring arm 250 is sufficient to move the charger-run arm 252 into contact with the negative battery terminal 318, but for the fact that the shutter button rib 257 intercepts arm 252 before that contact can be made and prevents the contact from occurring until the shutter button is released. In this way the operation of the motor is prevented until the exposure is made by the shutter of the camera. Similarly, as the release lever rotates clockwise, the motor shorting arm 254 is disconnected from terminal 306. Also, as the release lever rotates clockwise, the shutter latch engaging claw 246 on arm 244 engages the lip 222 of the shutter latch 140 rotating it counterclockwise so that the shutter blade engaging lip 220 releases the shutter latch surface 216 permitting the shutter blade 136 to be rotated counterclockwise under the influence of shutter spring 204. The arm 244 at this point hits a stop 318 (see FIG. 5) on the backside of the mechanism plate 112 to prevent the release lever from rotating further and inadvertently releasing the capping blade. After the shutter blade 136 has rotated approximately 36°, the ramp 218 on the trailing arm thereof contacts the lip 220 of the shutter latch 140 and, as the shutter blade moves further, the shutter latch is moved sufficiently to release the latch surface 217 of the capping blade 138. At this point the aperture 212 in the shutter blade 136 has uncovered the exposure aperture and permits exposure of the film through the lens. At the same time the radial arm 205 of the shutter blade contacts a flash synchronizing contact (not shown) which completes the flash circuit, firing the flash to illuminate the exposure. The capping blade has then been released by the latch member and covers the exposure aperture, completing the exposure. The shutter blade comes to rest against a shutter stop 332 on the back of the mechanism plate and the capping blade is trapped by the capping blade cocking tab 213 on the shutter blade. At this point the shutter exposure sequence is complete, but no further camera operation will occur until the user releases the shutter button.

When the camera user releases the shutter button, the button is returned to its initial position by the shutter button spring, permitting the charger-run switch leg 252 of the release lever to move into contact with the terminal 318 of the negative battery contact 314, energizing the motor 160. The motor drives the crown gear 150, the idler gear 152 and the cam gear 154. In the particular example illustrated the gear reduction is 181.3 to 1. The cam 230 on the cam gear rotates the drive link 288 about the pin 290 and, by engagement of end 292 of the drive link with the drive boss 190 on the driver member 188, causes the driver member to rotate in a first, counterclockwise direction. As the driver member rotates in the counterclockwise direction, the shutter blades are relatched and the advance lever prepares for film advance. Specifically, as the driver member 188 rotates counterclockwise it releases the blocking lever to block the release button, it cocks and latches the shutter blades, the film advance pawl is advanced over a tooth on the drive hub, the demetering lever cam is advanced around the lifting cam of the metering pawl and energy is stored in the driver member spring.

In particular, as the driver member begins its movement in the first direction, the blocking lever boss 194 moves away from the end 266 of the blocking lever 156, allowing the blocking lever to rotate under the influence of its spring in clockwise direction whereby the end 264 rotates under the rib 260 of the shutter button to prevent the shutter button from being redepressed during the film advance cycle. As the driver member is further rotated in the first direction, the shutter recocking lug 192 engages the shutter blade cocking tab 214 and moves the shutter blade in a clockwise direction towards the cocked position. The capping blade, in engagement with the tab 213 on the shutter blade is also recocked at the same time. As the driver member reaches the furthest extent of the motion in the first direction, the release lever reset arm 200 lifts the latch engaging arm 244 of the release lever off of the shutter latch 140, permitting the shutter latch to engage the shutter and capping blade latch engaging surfaces 216 and 217 and the shutter blades rotate clockwise. By this time the film advance pawl 196 of the driver member has snapped over the next tooth of the ratchet gear 102.

Simultaneously, the driver member advances the demetering lever 270 to the right, around the metering pawl cam 172 in position for lifting the metering pawl when the driver member begin its movement in the second direction. The motion of the driver member also extends the driver member spring 283, storing energy to be used for demetering and film advance.

Figure 8:
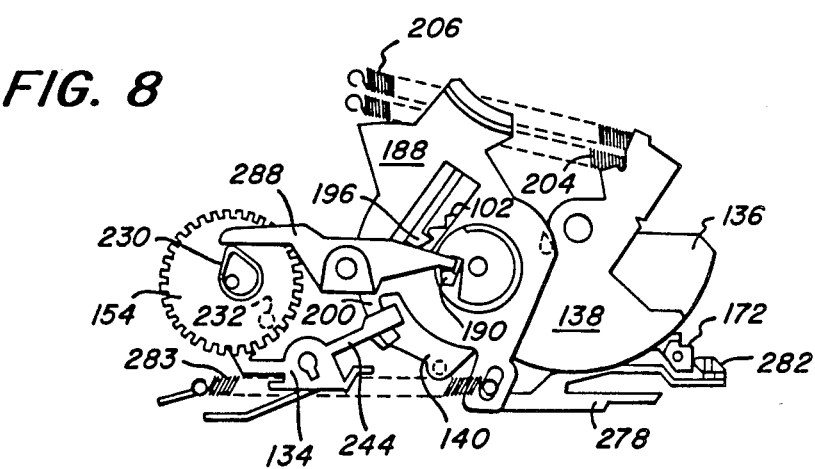
FIG. 8 is a view of the camera components at the time in the operation cycle when the drive link is at the apex of the cam lobe.

When the motor has driven the cam gear to the point that the drive link is at the apex of the cam lobe, the driver member is dwelling at a position 37° counterclockwise from its initial, at rest, position. This condition is illustrated in FIG. 8. At this point the driver member spring 283 is fully extended, the cam on the demetering lever has snapped around the metering pawl lifting cam, the film advance pawl is engaged with the next tooth on the ratchet gear of the drive hub, the blocking lever is under the shutter button, the shutter blades have been relatched, and the release lever is being held out of engagement with the shutter latch. This condition is transient only and has been described here for illustrative purposes only. The motor does not stop at this point but continues to run driving the gear train and the cam on the cam gear. As the apex of the cam lobe passes (in a clockwise direction) the drive link the cam will not further drive the driver member but will act with the gear train and motor as a governor, as the driver member is driven in the second direction back to its initial, at rest, position by the energy stored in the driver member spring 283.

As the spring pulls the driver member in the second, clockwise direction, the demetering lever cam 282 is pulled under the metering pawl lifting cam 172 to lift the metering pawl tooth 98 from the metering notch in the periphery of the film disk. As the metering pawl tooth is cleared from the film notch, the film advance pawl 196 on the driver member 188 starts to turn the hub member 84 and the film disk. Soon after the film disk has begun turning the demetering lever cam 282 is pulled from under the metering pawl lifting cam 172, letting the metering pawl tooth 98 down onto the surface of the turning film disk. As the driver member approaches the intial, at rest position, the boss 194 on the lower surface thereof engages the end 266 of the blocking lever 156 and moves the blocking lever counterclockwise removing the opposite end 264 from beneath the shutter button 16. At this point the film disk has advanced to the next frame and the metering pawl tooth drops in the next metering notch at the edge of the next film frame, arresting the movement of the film disk, the hub 84, and the driver member 188 with the tension of the driver member spring 283 maintaining tension on the driver member to hold the edge of the notch against the metering pawl tooth 98 until the next camera operation cycle is commenced.

The release lever reset arm 200 of the driver member 188 is also removed from beneath the shutter latch engaging arm 244 of the release member 134 returning to a position where it can be reset.

As the driver member is returned to its initial position, the motor continues to run, driving the cam gear until the boss 232 on the lower surface thereof engages the flange 240 on arm 236 of the release lever. Continued rotation of the cam gear resets the release lever. First the charger-run switch leg is pulled away from negative battery terminal 318, shutting off the motor. However, the motor and gears continue to coast until the charger-run switch arm touches the charging circuit terminal 322. This allows current to continue passing through the motor, allowing it to run until the motor shorting switch arm 254 contacts terminal 306 shorting the motor and stopping it almost immediately. At the same time, the shutter latch engaging arm 244 has been returned to its intial position ready for the next actuation of the shutter button to release the release lever to unlatch the shutter. The boss-engaging flange 240 of the shutter botton-engaging arm 236 of the release lever is abutting the cam gear boss 232 and the spring arm 250 is flexed ready to drive the release lever 134 upon actuation of the shutter button.

At this point the motor is shorted and stopped, the charger circuit is charging and the camera is ready for the next exposure. The charger circuit will continue to charge until the cover handle is closed, pulling the charger terminal 322 away from the charger-run switch arm 252.

After exposing the fifteenth, and final, film frame of a cartridge, the film advance mechanism commences to advance the film disk but is stopped in mid-stroke. The return of the driver member 188 in the clockwise direction is prevented by the blocking of further rotation of the disk by engagement of the hub ear with the upper edge of the cartridge ear, as described above. The shutter button is locked because the blocking lever has not been moved from beneath it. The motor and gear train may continue to run until the cycle is terminated by the boss on the cam gear recocking the release lever, turning off the motor. This occurs because the cam lobe is allowed to come away from the drive link which has not finished its motion because of the blockage of the driver member.

Alternative Embodiments

While the present invention has been described with respect to a preferred embodiment, it will be appreciated that variations in portions of the structure may be employed without departing from the concept of the invention. For example, referring to FIGS. 9–12, an alternative embodiment of a control mechanism for a motorized camera according to the present invention is illustrated. In this series of illustrations, 9a and b, 10a and b, 11a and b, and 12a and b, the "a" illustration is an electric schematic of the camera electrical circuit and the "b" illustration is a showing of the mechanical components of the control mechanism of the present invention. In these figures, components are given the same reference numeral as those of similar components in the preferred embodiment with the prefix "5".

In this embodiment the camera is provided with a power source, batteries 5165, a motor 5160, and a flash charging circuit 5317, and the control mechanism 5134. The control mechanism, similar to the release lever in the preferred embodiment comprises an electrically conducting lever arm 5252, that, in the at rest position, contacts terminal 5312, the positive side contact 5322 of the flash charging circuit 5317 and the motor shorting terminal 5306. When the shutter button 5255 is depressed, spring 5500 is pushed from beneath lever arm 5252 which, under a spring force, drops toward contact 5318 (see FIGS. 10a and b) and releases the shutter to make the exposure. The lever arm 5252 is stopped by the shaft 5257 of the shutter button before it reaches contact 5318 so that the exposure cycle is completed before the motor is started. When the shutter button is released, the lever arm 5252 makes contact with the contact 5318 to complete the motor circuit and allow the motor to run to advance the film (see FIGS. 11a and b). At the end of the film advance cycle means, not shown, recock the lever arm 5252, returning it to the initial position illustrated in FIGS. 9a and b.

Figure 12A:
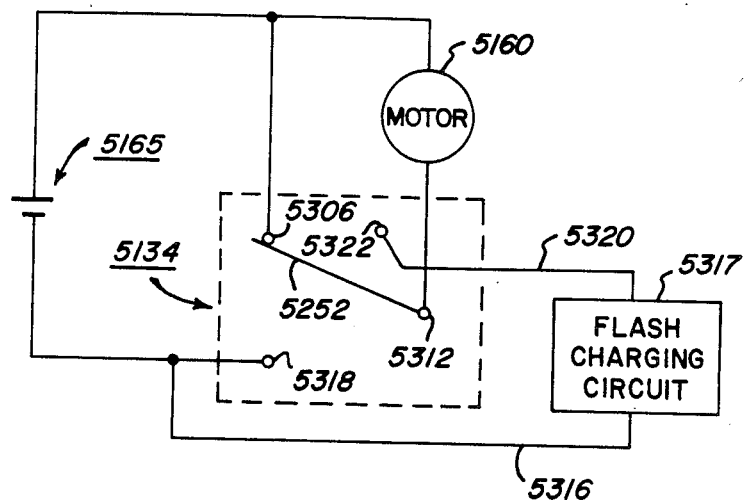
Figure 12B:
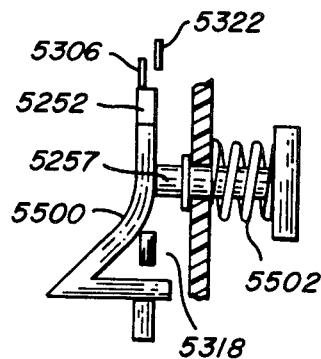

When the cover handle, or other main switching device is shut, terminal 5322 is moved away from the lever arm 5252 as shown in FIGS. 12a and b, disconnecting the batteries from all circuits in the camera.

Accordingly, the present invention provides a simple, compact and inexpensive camera control mechanism and yet provides one button operation to expose the film and actuating motor which then advances the film. The control provides the operational sequence control for the camera and, in cooperation with the manually operated shutter button, actuates the motorized film advance only after the exposure cycle is completed, assuring that no motor-imparted vibration affects the exposure. At the end of the film advance cycle the motor is disconnected and the control is reset ready for the next exposure. In another embodiment a further electrical function such as rangefinding or charging a flash circuit is controlled to occur only when the motor is not operating, thus minimizing the current drain upon the batteries. In still another embodiment the control mechanism is arranged to accurately control the stoppage of the motor to prevent coasting or overrun by shorting across the motor at the appropriate time in the operating cycle.

The invention has been described with reference to specific embodiments and variations, but it should be apparent that other modifications and variations can be made within the spirit and scope of the invention, which is defined by the following claims.

We claim:

1. In a motorized camera having a cockable and releasable shutter means, film advancing means, motor means, driving means coupling said motor means to said film advancing means, a power source, and a manually actuated shutter button, the improvement comprising:

control means for releasing said shutter means and actuating said motor means, said control means comprising a first means arranged to be engaged by said shutter button when said shutter button is depressed to release said control means, said control means being arranged to move from an initial position to a second position to release said shutter means and being held in said second position by said depressed shutter button, said control means arranged to move to a third position when said shutter button is released whereby said control means energizes said motor by connecting it to said power source to start a film advancing cycle, means including said driving means for returning said first means to said initial position at the end of the film advancing cycle to de-energize said motor.

2. The invention according to claim 1 wherein said control means includes second means arranged to connect with a terminal of said motor means when said control means moves to said third position.

3. The invention according to claim 2 wherein said shutter button blocks said second means from reaching said motor terminal when said shutter button is depressed and releases said second means to contact said motor terminal when said shutter button is released.

4. The invention according to claim 3 wherein said motor has a pair of electric terminals and wherein said control means includes third means arranged to connect the terminals of said motor together when said first arm is in the initial position to short said motor.

5. The invention according to claim 1 wherein said control means is arranged to connect said power source to another electric circuit in said camera when the first means is in said initial position.

6. The invention according to claim 5 wherein said other electric circuit is a flash charging circuit.

7. The invention according to claim 5 wherein said control means includes second means arranged to connect with a terminal of said motor when said control means moves to said third position and to connect said power source to said other electric circuit when said control means is in said initial position.

8. The invention according to claim 4 wherein said control means includes fourth means arranged to connect said control means to said power source.

9. The invention according to claim 8 wherein said fourth means includes a spring member that urges said control means from said initial position towards said third position.

10. The invention according to claim 8 wherein said control means includes fifth means arranged to engage said shutter means and release said shutter means when said control means is moved to said second position.

11. The invention according to claim 1 wherein said control means includes first, second, third, fourth and fifth arm means extending from a hub means, said hub means arranged to pivot about an axis to move said first, second and third arm means between an initial and second and third positions.

12. The invention according to claim 11 wherein said control means is formed of a resilient electrically conductive material.

13. The invention according to claim 1 wherein said first means is flexible in a direction perpendicular to the direction of movement of said means from said initial position to said third position.

* * * * *